(No Model.) 2 Sheets—Sheet 1.
A. MERREL & A. DUFFEK.
EXTIRPATOR.
No. 555,219. Patented Feb. 25, 1896.
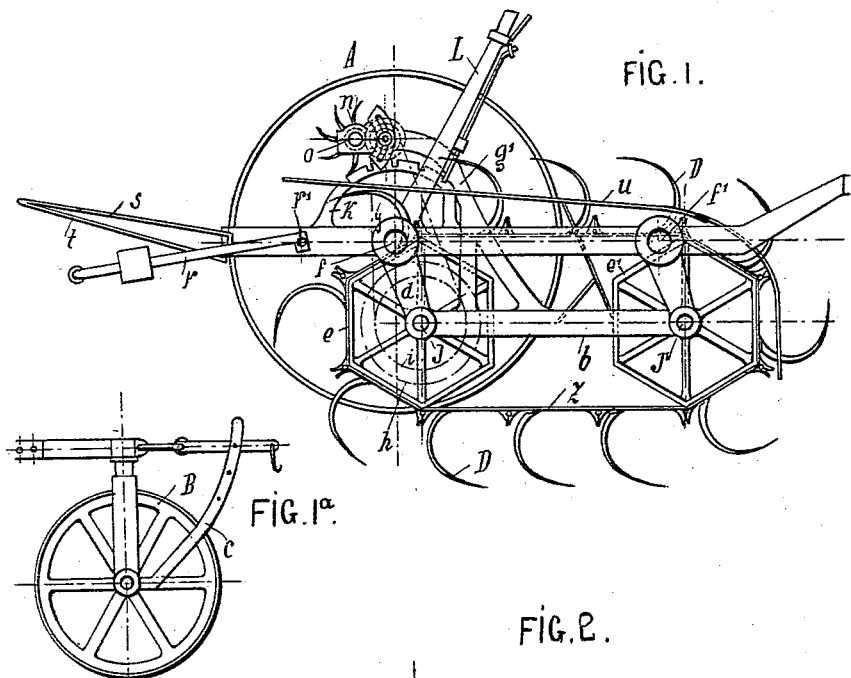
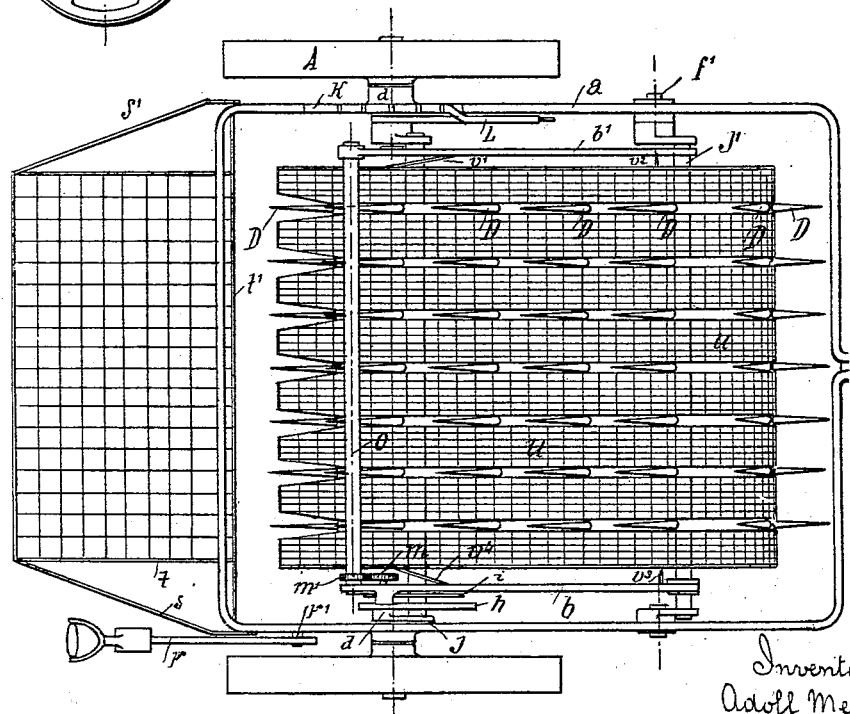

(No Model.) 2 Sheets—Sheet 2.

A. MERREL & A. DUFFEK.
EXTIRPATOR.

No. 555,219. Patented Feb. 25, 1896.

United States Patent Office.

ADOLF MERREL AND ARTHUR DUFFEK, OF PRAGUE, AUSTRIA-HUNGARY.

EXTIRPATOR.

SPECIFICATION forming part of Letters Patent No. 555,219, dated February 25, 1896.

Application filed August 31, 1895. Serial No. 561,152. (No model.)

*To all whom it may concern:*

Be it known that we, ADOLF MERREL and ARTHUR DUFFEK, of Prague, Bohemia, Austria-Hungary, have invented certain new and useful Improvements in Extirpators, of which the following is a specification.

Our extirpator comprises two polygonal drums mounted upon a parallelogram so as to be varied in height upon a carrying-frame mounted upon wheels and driven by horses or otherwise, one of the drums gearing with the driving-axle so as to revolve when the machine is being driven. Over the two drums endless chains are laid, which are composed of links, each link carrying a tine. The tines are curved and sharpened, and on the lower side of the chains, when the drums are lowered, they reach into the earth. They move upon and with their chains in the same direction in which the implement is driven, so that they extirpate the weeds and herbs from the earth and carry them overhead. Between the tined chains in the upper part of their travel there are wire cribbles shaken by the motion of the implement and carried by appropriate arms upon the frame, by which arrangement the weeds and herbs are cleansed from the particles of earth which hang upon them, and by a quickly-rotating series of small tines are thrown upon a horizontal cribble mounted upon the rear end of the machine, and which can be tilted from time to time so as to throw the accumulated weeds down.

Figure 3:
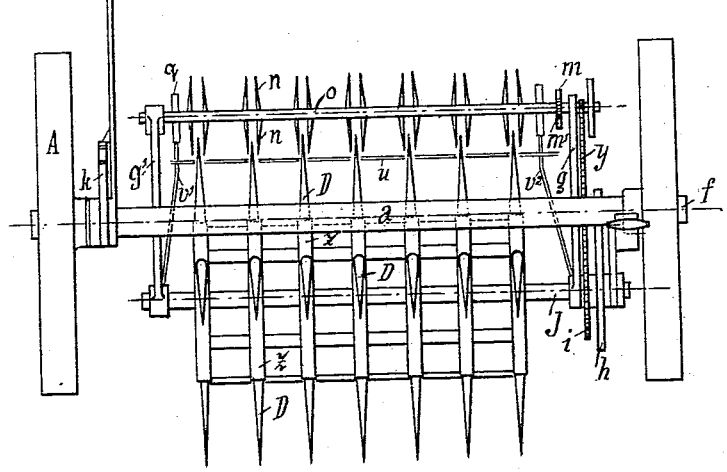
Figure 4:
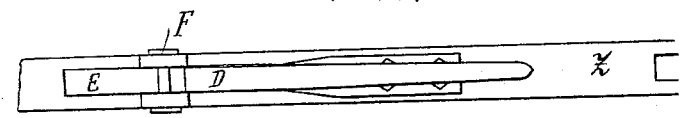
Figure 5:
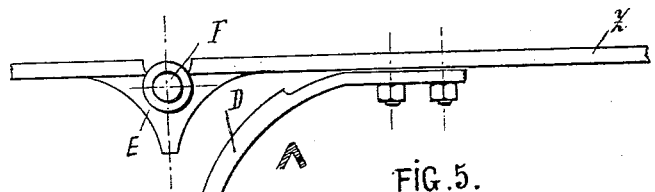

In the accompanying drawings, Figures 1 and 2 show the machine in a vertical and in a horizontal position. Fig. 1ª shows the front part of Fig. 1 with the guiding-wheel. Fig. 3 is a rear view of the machine without the tilting cribble. Figs. 4 and 5 represent a chain-link with its tine in two projections.

Upon an iron framing $a$, which is supported and driven upon the wheels A and A' and a leading wheel B with its adjusting-piece C, a pair of polygonal drums $e\ e'$ are mounted. The horizontal shafts J and J' of said drums are journaled at the ends of two pairs of equal and parallel levers $d$ and $d'$, which are linked together with horizontal bars $b$ and $b'$ and which swing upon their axles $f$ and $f'$ while the distances between $f\ f'$ and J J' are equal, $f f'$ J J' forming thus a parallelogram. By means of a lever $d$ and segment K the levers $d\ d'$ can be lowered or lifted up and with them both the polygonal drums $e$ and $e'$ will descend or rise. Over these drums elastic steel chains are laid, each chain-link covering exactly one side of the drums, over which the chains are spanned. Each link $z$ carries on its outward side a tine D properly curved and sharpened, the tine being preferably of a V-shaped section, as shown by Fig. 5. The links and chains are preferably made from the best steel material. At the end of each link outward projections E may be disposed, being so adjusted that they stem one against the other when the chain is strained. The links are hinged together with the bolts T, Figs. 4 and 5.

Upon the axle J a toothed wheel $h$ is fixed, gearing upon a small toothed wheel which is fixed upon the driving-axle $f$, so that in driving the machine the polygonal drum $e$ is turned and with it the tines are moved on the lower part of the tined chains in the driving direction, in which they also are curved, so that they extirpate the weeds and herbs on their way and carry them upward. Between the chains and tines in the upper part of their movement wire cribbles $u$ are disposed, shaking the earth which the weeds bring with them off through the cribbles. Upon the frame $a$ arms $g\ g'$ are fastened, into which a horizontal shaft $o$ with small tines $n$ is journaled. Upon this shaft a small toothed wheel $m$ is fixed, gearing with another toothed wheel. This second small wheel is fixed upon a horizontal spindle, upon which at the same time a small chain-wheel is fixed, a chain $y$ being laid over it and the chain-wheel $i$ which is fixed upon the axle J. The axle of the small chain-wheel and the toothed wheel $m$ can be fixed in a slit which is concentric to $o$, by which means the chain $y$ can be conveniently stretched.

Upon the spindle $o$ pins $q$ are provided, which at each rotation of $o$ beat into the prolongations of the arms $v'\ v^2\ v^3$, &c., which carry the wire cribbles $u$, shaking the cribbles very energetically.

The weeds and herbs being brought to the rotating tines $n$ are thrown by them off and down upon a lower cribble $t$, which is fixed to the rear end of the framing $a$ by means of a horizontal axle $t'$ around which it can swing, and with arms $s$ and $s'$ outside at its ends. To one side of this rear cribble tilting-lever $r$ is arranged, attached with its fulcrum $r'$ upon the frame $a$ reposing with its weight upon a pin, which projects from the prolongation of the bar $s$ over the axle $t'$, so that the weight of and upon the lever $r$ keeps cribble $t$ in its upright position. In lifting this lever $r$ the cribble $t$ will tilt down with its contents of weeds and herbs, which latter will fall to the earth, and the cribble will mount into its former position again if the lever $r$ is let down. We do not limit ourselves exclusively to this tilting arrangement, as this can be constructed in any convenient way and is given here only as an example.

We claim—

1. In an extirpator, the combination of two drums journaled in a parallelogram upon a frame $a$, the drums carrying endless chains, each chain-link being adapted to each side of the drums and provided with tines, with a proper gearing between the axle of the drum $e$ and the driving-axle of the extirpator, so that the tines can be lowered or raised, shaking cribbles $u$, rotating tines $n$, and a rear cribble $t$, substantially as set forth.

2. In an extirpator, the combination of tines D upon endless chains composed of elastic tined links $z$, the hinges F of which are provided with outward projections E which stem one against the other under each hinge F when the chains are strained, substantially as and for the purpose set forth.

In witness whereof we have hereunto set our hands in presence of two witnesses.

ADOLF MERREL.
ARTHUR DUFFEK.

Witnesses:
ADOLPH FISCHER,
L. VOJAIÉLE.